(12) United States Patent
Brinster et al.

(10) Patent No.: US 9,216,692 B2
(45) Date of Patent: Dec. 22, 2015

(54) SEAT PANEL POCKET AND METHOD

(75) Inventors: Jesse J. Brinster, Redford, MI (US);
Robert L. Demick, Macomb Township, MI (US); Daniel W. Booth, Warren, MI (US); Cheryl L. Smith, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1394 days.

(21) Appl. No.: 12/706,748

(22) Filed: Feb. 17, 2010

(65) Prior Publication Data

US 2011/0198896 A1  Aug. 18, 2011

(51) Int. Cl.
*A47C 7/62* (2006.01)
*B60R 7/00* (2006.01)
*B60R 11/00* (2006.01)

(52) U.S. Cl.
CPC . *B60R 7/005* (2013.01); *A47C 7/62* (2013.01); *B60R 2011/0015* (2013.01); *Y10T 29/481* (2015.01)

(58) Field of Classification Search
CPC .. B60R 2011/0015; B60R 7/005; A47C 7/62; Y10T 29/481
USPC ............. 297/452.18, 452.56, 188.04, 188.06, 297/188.2, 440.1; 296/37.13, 152, 37.15, 296/37.8; 403/381, 375
See application file for complete search history.

(56) References Cited

U.S. PATENT DOCUMENTS

| | | | | |
|---|---|---|---|---|
| 1,995,143 | A | * | 3/1935 | Burch ........................ 296/37.13 |
| 2,383,125 | A | * | 8/1945 | Hill ............................... 297/146 |
| 3,044,785 | A | * | 7/1962 | Geyer ........................... 277/500 |
| 3,730,581 | A | * | 5/1973 | Parkinson .................. 296/37.13 |
| 4,668,010 | A | * | 5/1987 | Fujiwara ....................... 297/150 |
| 4,832,241 | A | * | 5/1989 | Radcliffe ....................... 224/275 |
| 5,004,295 | A | * | 4/1991 | Inoue ........................ 297/188.07 |
| D324,953 | S | * | 3/1992 | Swanner ...................... D12/416 |
| 5,292,174 | A | * | 3/1994 | Ohnuma ................... 297/188.07 |
| 5,318,346 | A | * | 6/1994 | Roossien et al. ........... 297/300.1 |
| 5,499,853 | A | * | 3/1996 | Pourian ..................... 296/37.13 |
| 5,560,683 | A | * | 10/1996 | Penley et al. ............. 297/452.56 |
| 5,716,091 | A | * | 2/1998 | Wieczorek ................. 296/37.16 |
| D406,096 | S | * | 2/1999 | Lucas, Jr. ..................... D12/416 |
| 5,951,085 | A | * | 9/1999 | Fukatsu ....................... 296/37.8 |
| 6,059,358 | A | * | 5/2000 | Demick et al. ........... 297/188.04 |
| 6,131,993 | A | * | 10/2000 | Pesta et al. ............... 297/188.04 |
| 6,142,561 | A | * | 11/2000 | Pesta et al. ............... 297/188.04 |

(Continued)

FOREIGN PATENT DOCUMENTS

DE  4433422 A1  3/1996
DE  4433426 A1  3/1996

(Continued)

*Primary Examiner* — Milton Nelson, Jr.
(74) *Attorney, Agent, or Firm* — Quinn Law Group, PLLC

(57) ABSTRACT

A panel member assembly forming a pocket, and a method for fabricating the panel member assembly is provided. The panel member assembly including a panel including a non-linear slot which may be a generally U-shaped slot, an insert which is inserted into the slot to form the pocket, and a retainer attachable to the panel to retain the insert in the slot. The panel includes one or more attaching features and the retainer includes one or more attaching features to attach the panel and the retainer to each other, thereby retaining the insert in the slot. In a preferred embodiment, the retainer may be heat staked to the panel. The insert may include one or more additional features, such as cording, loops or rickrack to attach the pocket to the panel or the retainer.

15 Claims, 5 Drawing Sheets

(56) References Cited

U.S. PATENT DOCUMENTS

| | | | |
|---|---|---|---|
| 6,199,948 B1* | 3/2001 | Bush et al. | 297/217.3 |
| 6,231,099 B1* | 5/2001 | Greenwald | 296/37.8 |
| 6,471,276 B1* | 10/2002 | Brunsman et al. | 296/37.13 |
| 6,592,179 B1* | 7/2003 | Miyazaki | 297/146 |
| 6,682,115 B1* | 1/2004 | Tiesler | 296/37.1 |
| 6,702,375 B1* | 3/2004 | Laskowski et al. | 297/188.07 |
| 6,752,304 B1* | 6/2004 | Hotary et al. | 224/544 |
| 6,880,874 B1* | 4/2005 | Kallenberger et al. | 296/37.13 |
| 6,971,716 B2* | 12/2005 | DePaulis et al. | 297/229 |
| 7,222,915 B2* | 5/2007 | Philippot et al. | 297/216.13 |
| 7,300,105 B2* | 11/2007 | Jasinski et al. | 297/188.04 |
| 7,303,232 B1* | 12/2007 | Chen | 297/284.8 |
| 7,523,985 B2* | 4/2009 | Bhatia et al. | 297/188.04 |
| 7,857,388 B2* | 12/2010 | Bedford et al. | 297/284.7 |
| 7,984,952 B2* | 7/2011 | Begin et al. | 297/452.56 |
| 8,141,948 B2* | 3/2012 | Cassellia et al. | 297/217.3 |
| 8,540,309 B2* | 9/2013 | Berger et al. | 297/163 |
| 8,677,572 B2* | 3/2014 | Scroggie et al. | 24/292 |
| 2003/0185651 A1* | 10/2003 | Lees | 411/432 |
| 2004/0239155 A1* | 12/2004 | Fourrey et al. | 297/163 |
| 2006/0006359 A1* | 1/2006 | Alman et al. | 251/360 |
| 2006/0149240 A1* | 7/2006 | Jackson | 606/61 |
| 2007/0199864 A1* | 8/2007 | Ebihara et al. | 206/752 |
| 2008/0164712 A1* | 7/2008 | Burkey et al. | 296/65.09 |
| 2008/0252111 A1* | 10/2008 | Rothkop et al. | 297/188.04 |
| 2009/0001748 A1* | 1/2009 | Brown et al. | 296/37.8 |
| 2011/0052134 A1* | 3/2011 | Barnes et al. | 385/137 |
| 2011/0266234 A1* | 11/2011 | Ritzler et al. | 211/41.1 |
| 2011/0298250 A1* | 12/2011 | Line et al. | 297/163 |

FOREIGN PATENT DOCUMENTS

| | | |
|---|---|---|
| DE | 10247585 A1 | 4/2004 |
| DE | 102004030220 A1 | 2/2005 |
| EP | 1260433 A2 | 11/2002 |
| JP | 2000159028 A | 6/2000 |
| JP | 2002104079 A | 4/2002 |

* cited by examiner

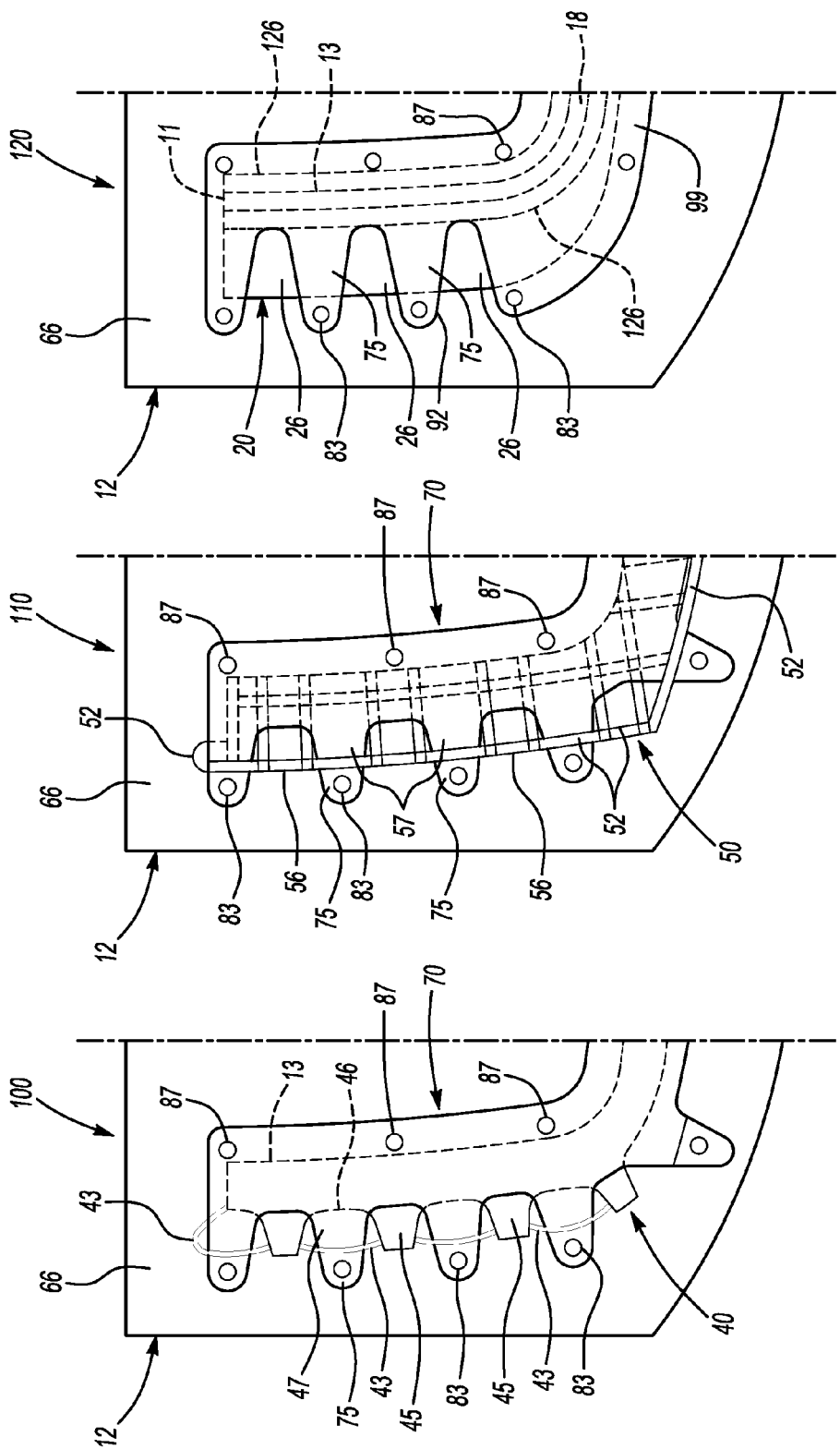

SEAT PANEL POCKET AND METHOD

TECHNICAL FIELD

The present invention relates generally to a panel member assembly which forms a pocket.

BACKGROUND OF THE INVENTION

Automotive seat back panels generally include a storage pocket to store roadmaps and other articles, for the convenience of the vehicle owner or use by a passenger. Storage pocket design presents challenges to the vehicle designer in the form of too many design executions for varying styling considerations, parting lines between the pocket and seat panel which may be difficult to control as to width, alignment, closure, etc., exposed trim pieces and/or retainers to retain the seat pocket insert in place which may become detached with excessive or rough use of the pocket, or may result in parting line gaps with the panel. Retention methods may be ineffective or lack durability, resulting in pockets which may become distorted, sag, take a permanent set in a stretched position, or may become wavy or relaxed so as to gap open at all times, reducing capability to retain or conceal stored contents in the pocket. These conditions may result in an unsightly appearance and provide an impression of poor quality to the vehicle owner or user.

SUMMARY OF THE INVENTION

A panel member assembly including a pocket incorporated into the panel in a manner to retain the appearance, position, shape and storage capability of the pocket over time and after repeated use is provided herein. By simplifying the pocket configuration to minimize the number of parting lines, exposed retainers or trim parts, the panel and pocket assembly provided herein produces an appealing design aesthetic. Additionally, the simplified pocket configuration reduces the cost of production, by providing an assembly method and panel slot configuration which may be used with varying types of pocket materials and varying seat panel profiles and sizes, to standardize pocket related design, manufacturing and assembly processes, improving quality and minimizing costs.

Provided herein is a panel member assembly comprising a pocket formed by inserting a pocket insert into a slotted opening such that the portion of the insert which is visible with the outwardly facing surface of the panel defines a pocket between itself and a portion of the outwardly facing surface of the panel. The pocket is defined by and the insert is retained in the slotted opening of the panel by attaching a retainer to the inwardly facing surface of the panel with one or more attachments. The pocketed panel assembly provided herein may be included as the rear panel of a seat assembly, where the seat assembly may be of the type which may be used in a vehicle, for example, in an automobile, sports utility vehicle, truck, bus, train, airplane, etc.

The seat back panel or panel assembly may include a panel configured to at least partially form a pocket, the panel assembly including the panel defining a slot, an insert, and a retainer. The insert may be configured to be insertable into the slot. The panel and the retainer may be configured to be operatively attached to each other, such that when the panel and retainer are attached to each other, the insert is retained in the slot to at least partially form the pocket.

The panel opening into which the insert is installed or inserted may be configured as a non-linear slot, which may include one or more generally horizontal portions and generally vertical portions. In a preferred embodiment, the panel opening may be generally configured as a U-shaped slot. The slot edge may be provided in an as-formed condition, or may be at least partially finished by adding a trim piece, a coating or a film, or by folding a portion of an appearance fabric covering the panel over the edges of the slot to form a hem around the perimeter of the slot.

The panel member may have a first surface and a second surface, which may be a front surface and a back surface of the panel. The first side or front surface typically may be outwardly facing and may provide an appearance surface, also referred to as a "Class A" surface, or may be a substrate covered by an appearance fabric to provide a "Class A" surface. The pocket opening is accessible from the first surface. The second, or back surface, may be typically inwardly facing, and the retainer may be operatively attached to the second surface to retain the pocket insert in the slot defined by the panel. The panel member may be configured to include at least one attaching feature, typically provided on the second or back surface of the panel. The retainer may be configured to include at least one attaching feature corresponding to an attaching feature on the panel member. Each retainer attaching feature and its corresponding panel attachment feature are configured to be attachable to the other when the panel and the retainer are operatively attached to each other. The attaching features of the panel and the retainer may be of various configurations, including attaching features configured as one or a combination of a stud, rivet, protrusion, opening, hole, slot, loop, clip, hook, tab, finger, hook fastener, loop fastener and adhesive. In a preferred embodiment, the attaching feature or features on the panel is configured as protrusions or studs and the corresponding attaching feature or features on the retainer may be configured as holes or openings, where the panel and retainer are operatively attached to each other by inserting protrusions or studs of the panel through the corresponding holes or openings of the retainer, and fixedly attaching each protrusion or stud to its corresponding opening by staking, heat staking, spinning or riveting the protrusion.

The insert may be fabricated from leather, vinyl, cloth, polymeric, plastic and netting material, and may be configured to include one or more cords, straps, loops, bands, elastic trim, bungee cords, rickrack, tabs, holes and openings to operatively attach the insert to one or both of the panel and retainer.

In a preferred embodiment, the panel member assembly including a storage pocket is provided as a rear panel of a vehicle seat. The panel member assembly including a storage pocket may also be provided as a panel incorporated into another surface where a convenient storage pocket is desirable, for example, the door panel of a vehicle, the interior wall panel adjacent to a seat on an airplane, a wall insert for the storage of magazines or other documents, etc.

This invention also includes a method for fabricating the foregoing structure. In one aspect the method comprises forming a panel member with front and back surfaces to form a slot; and inserting an insert into the slot of the panel member to form a pocket between the front surface of the panel member and the back surface of the insert after the insert is inserted.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6A is a partial schematic view of a seat assembly comprising the panel member of FIG. 2B, the attaching feature insert of FIG. 3C and the retainer of FIG. 4A;

FIG. 6B is a partial schematic view of a seat assembly comprising the panel member of FIG. 2B, the insert of FIG. 3D and the retainer of FIG. 4A; and FIG. 7 is a partial schematic view of a seat assembly comprising the panel member of FIG. 2B, the insert of FIG. 3A and the retainer of FIG. 4C.

DESCRIPTION OF THE PREFERRED EMBODIMENTS

Figure 1:
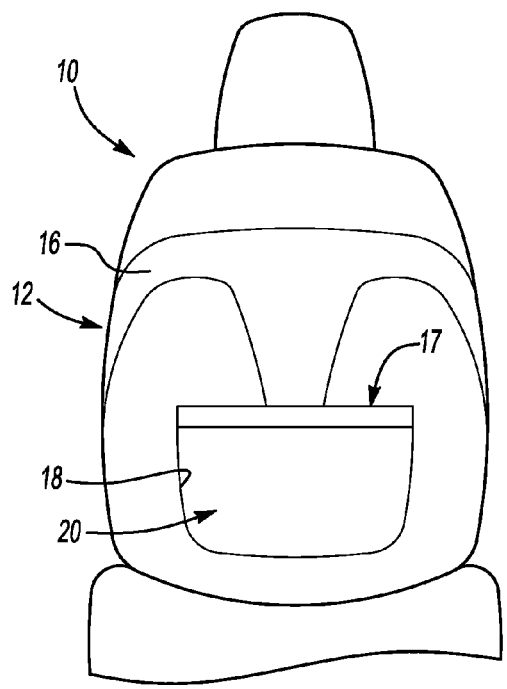
FIG. 1 is a schematic rear view of a seat assembly including a panel member assembly.

With reference to the drawings, wherein like reference numbers refer to the same or similar components throughout the several views, and beginning with FIG. 1, a seat assembly is generally indicated at 10. The seat assembly is of the type which may be used in a vehicle, for example, in an automobile, sports utility vehicle, truck, bus, train, airplane, etc. As shown in FIG. 1, seat panel member assembly 10 includes a panel member 12 which includes a pocket portion 19. An insert 20, which may also be referred to as a pocket portion, is operatively attached to panel member 12 to form a pocket 17 with a pocket portion 19 of an appearance side 16 of panel member 12. Pocket 17 may, for example, be used for storage of items such as maps, magazines, books, and other items of the type typically stored in a seat pocket. In a preferred embodiment, insert 20 is positioned in an opening 18, which is a non-linear slot, such that the central portion of insert 20 is visible on the outward or appearance side 16 of panel 12 and a pocket 17 with side and bottom edges defined by slot 18 is formed between the visible portion of insert 20 and the appearance side 16 of panel 12.

In the preferred embodiment shown in FIG. 1, the panel member 12 including the storage pocket 17 is shown as the rear panel of a seat, which may be a vehicle seat, as described previously. Alternatively, the panel member 12 including the storage pocket 17 may be a panel incorporated into another surface where a convenient storage pocket is desirable, for example, the door panel of a vehicle, the interior wall panel adjacent to a seat on an airplane, a wall insert for the storage of magazines or other documents, etc.

Figure 2A:
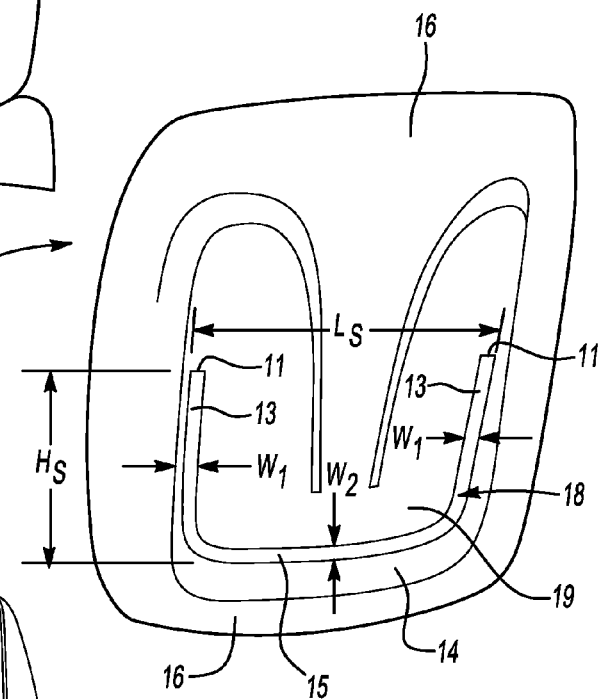
FIG. 2A is a schematic perspective view of a first surface of a panel member of the panel member assembly of FIG. 1.

Referring now to FIG. 2A, panel member 12 is shown without the pocket insert 20, and with a perspective view of a first surface 16. First surface 16 of panel member 12 is generally configured to be outwardly facing when positioned for use, e.g., first surface 16 may typically be an appearance surface or provide a substrate or support surface for the application of an appearance surface treatment, such as a coating, paint or film, or a textile or fabric treatment, for example, first surface 16 may be covered with a leather or vinyl covering. Panel member 12 further defines an opening or slot 18, as shown in FIG. 2A. The slot 18 may be continuous and non-linear in shape, where the shape of the slot generally defines the non-open edges of pocket 17 (see FIG. 1). The opening may be, as shown in FIG. 2A, generally of a U-shape, where the overall length from one side portion 13 of slot 18 to the other side portion 13 of slot 18 is shown as $L_S$. Further, the overall height of slot 18, from slot ends 11 to slot bottom portion 15 is shown as $H_S$. The width of the side portions 13 of slot 18, which may also be described as generally vertical portions 13 of slot 18, is shown as $W_1$, and the width of bottom portion 15 of slot 18, which may also be described as the generally horizontal portion 15 of slot 18, is shown as $W_2$. Panel member 12 may have a generally flat profile or may be configured with sections of varying depth and profile, for purposes of ornamentation, structure or reinforcement, or, for example, to provide a transitional or generally recessed portion in which pocket 17 may be positioned. As shown in FIG. 2A, a transition portion 14 of the panel may provide the transition surface from one surface portion of panel member 12 to another surface or pocket portion 19 of panel 12 generally underlying pocket 17.

Panel member 12 may be stamped, molded or otherwise formed using methods known to those skilled in the art, in such a manner as to provide a panel of suitable configuration for incorporation into the end user application, shown in FIG. 1 as a seat assembly. In a preferred embodiment, panel member 12 is molded from a resin, plastic or polymeric material, and slot 18 is molded into panel member 12 during the process of forming panel member 12. Alternatively, panel member 12 may be fabricated from a metallic, polymeric or laminate material, by stamping, pressing or other suitable means. Slot 18 may be fabricated during the fabrication operation producing panel member 12 or fabricated and/or finished by a subsequent operation or operations, such as machining, cutting, punching, grinding, trimming, deburring or other means suitable to form and finish slot 18 in panel member 12. As discussed previously, an appearance layer may be applied, adhered, fastened or laminated to the outwardly facing surface 16 of panel member 12 to provide a first surface 16 which may be an appearance surface. The appearance surface 16 may also be referred to as a first side, front surface, front side, an "A" surface or "Class A" surface.

Figure 2B:
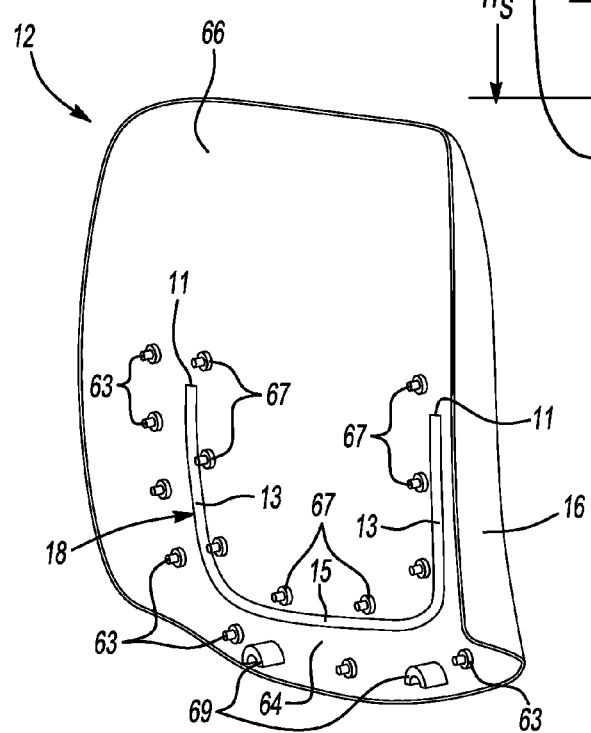
FIG. 2B is a schematic perspective view of a second surface of the panel member of FIG. 2A.

FIG. 2B illustrates another perspective view of panel member 12, generally showing a second surface, reverse side, back side or second side 66, which would typically be the inwardly facing, or non-visible side, when panel member 12 is in an assembled position, for example, when panel member 12 is assembled into a seat assembly 10 as shown in FIG. 1. Second surface 66 may typically be unfinished, for example, second surface 66 may be the as-formed surface of a plastic injected molded panel member 12, and may be referred to as inside surface 66, "B" surface 66 or "Class B" surface 66. Reverse side or second surface 66 of panel member 12 may include a plurality of attachment features 63, 67 and a transition surface 64. Attachment features 63 are generally located outboard of slot 18 and are used to fasten or attach a retainer to the second surface 66 of panel 12. Additionally, attachment features 63 are spaced peripherally from slot 18 so as to be located outboard of the perimeter of insert 20 when insert 20 is assembled in slot 18 (see FIG. 5B). Attachment features 67 are generally located inboard of slot 18 and, similar to attachment features 63, are used to fasten or attach a retainer to second surface 66 of panel 12. Attachment features 63, 67 may be of any suitable configuration corresponding to attachment features on a retainer (see FIGS. 4A, 4B, 4C). For example, one or more of attachment features 63, 67 may be a stud, rivet, protrusion, opening, hole, slot, loop, clip, hook, tab, finger, bolt, screw, nut, land, hook or loop (Velcro™) or adhesive type fastener. Referring again to FIG. 2B, second surface 66 may also include seat attachment features such as the doghouse attachment features 69, which may fasten or attach to corresponding attachment features such as flex clips, bird beak clips or W-prong clips to attach the panel member 12 to another portion of seat assembly 10.

Figure 3A:
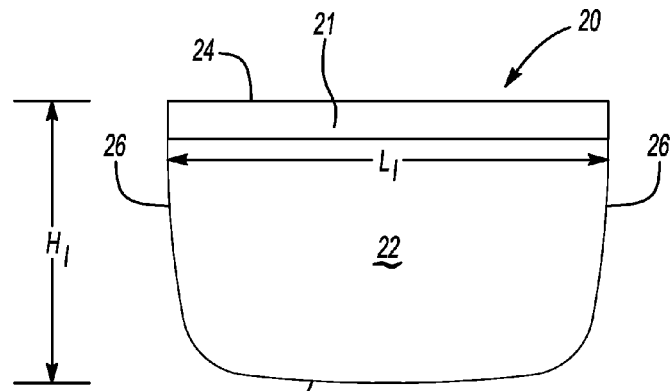
FIG. 3A is a schematic plan view of an insert of the panel member assembly of FIG. 1.

Insert 20, which may also be referred to as a pocket insert, is shown in additional detail in FIG. 3A. In a preferred embodiment, insert 20 may be generally U-shaped, where the overall length from one insert side edge 26 to the other insert side edge 26 is shown as $L_I$. Further, the overall height of insert 20, from insert bottom edge 28 to insert top edge 24 is shown as $H_I$. The side edges 26 may also be referred to as generally vertical edges 26, referencing the orientation of the insert when installed in the panel member and seat assembly. Similarly, bottom edge 28 and top edge 24 refer to the edge orientation of the insert in its installed position in the seat assembly. Top edge 24 may also be referred to as lead edge 24, as this edge is the leading edge of the insert as it is installed or inserted into slot 18. Lead edge 24 is exposed and visible with the appearance surface of panel member 12, therefore lead edge 24 may have a folded over or hemmed portion 21, or may have a trim piece 21 added to finish edge 24 for improved appearance. Foldover or hem portion 21 may be reinforced to increase the resistance of edge 24 to stretching or distortion during use of pocket 17, or may include a stretchable or elasticized material or component to assist the return of edge 24 to its as installed condition after use, preventing permanent stretching, sagging, waviness or distortion. Insert 20 may be made from any material 22 suitable for use as a pocket portion in the panel application. For example, for use as a vehicle seat panel pocket 17, insert 20 may be fabricated from one or a combination of a leather, vinyl, plastic, polymer, cloth, textile, netted or meshed material or fabric. For example, shown is FIG. 3D is an insert 50 fabricated from a netting or mesh-like material 52. The netted material 52 may be knotted or woven from cord or other string-like material which may have elastic properties to provide a pocket 17 which is expandable after assembly, e.g., expandable to provide increased storage capacity to the user. The netting or meshed material 52 may define holes 57 through which contents placed into pocket 17 may be viewable. Leading edge 54 may be folded over and hemmed 51 or may be reinforced, for example, with a bungee or elasticized cord, stitching, an adhesive or an insert, which may be a plastic insert or hardboard stiffening member, to retain the shape and closure capabilities and prevent distortion or sagging of leading edge 54 after repeated use of pocket 17. As will be discussed in detail further, holes 57 along side edges 56 and/or bottom edges 58 may function as retention features, by looping holes 57 over hooks, tabs, fingers or otherwise fastened to retention features or attachment features on a retainer (see FIG. 6B) or on second surface 66 of panel member 12 to further retain and prevent distortion of insert 50 in slot 18 after assembly to form a pocket 17.

Figure 3B:
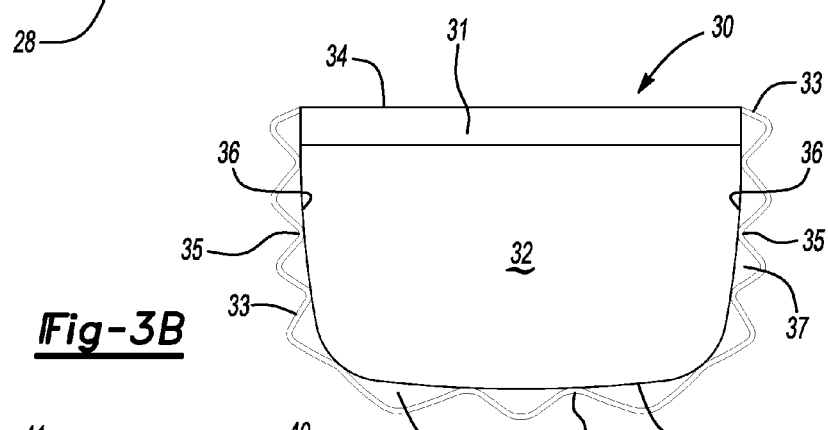
FIG. 3B is a schematic plan view of the insert of FIG. 3A including an attachment feature.

Referring now to FIG. 3B, shown is insert 30, which includes a retention feature 33 which, as will be discussed in detail further, may be looped over hooks, tabs, fingers or otherwise fastened to retention features or attachment features on a retainer or on second surface 66 of panel member 12 to further retain and prevent distortion of insert 50 in slot 18 after assembly to form a pocket 17. Insert 30 may be configured generally as described for insert 20, of material or materials 32 as described previously for insert 20, and having a top or lead edge 34, an optional trim, foldover or hem 31 which may be reinforced; further including side edges 36 and a bottom edge 38. Insert 30 may be fabricated by adding retention feature 33 to an insert 20. Retention feature 33 may be a cord or cording 33, which may be an elastic, textile or bungee cord, or may be a rickrack trim made from an elastomeric, elasticized or textile material. The retention feature 33 may be provided as a single continuous element, for example, a single length of rickrack or cording. Alternatively retention feature 33 may be provided in two or more segments, for example, in three segments each attachable to a side 36, 38 of insert 30. The retention feature 33 may be attached to insert 30 by any suitable means. For example, rickrack or cording 33 may be stitched, stapled or clipped 35 at intermittent intervals to edges 36, 38 of insert 30, so as to form loops, openings or holes 37 which may be fastened over corresponding features on a retainer or on second surface 66 of panel 12. The end portions of cording or rickrack 33 may be entrapped or fastened within the foldover or hem portion 31 by stitching, clips, adhesive or other suitable means.

Figure 3C:
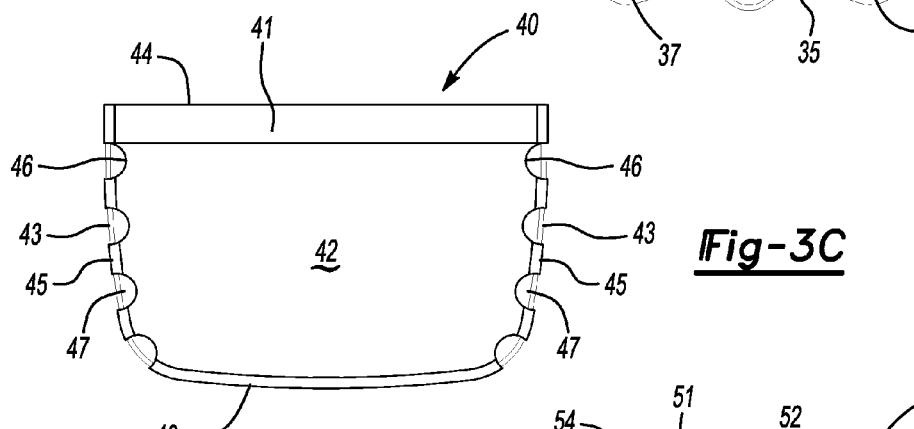
FIG. 3C is a schematic plan view of the insert of FIG. 3A illustrating an alternative construction.
Figure 3D:
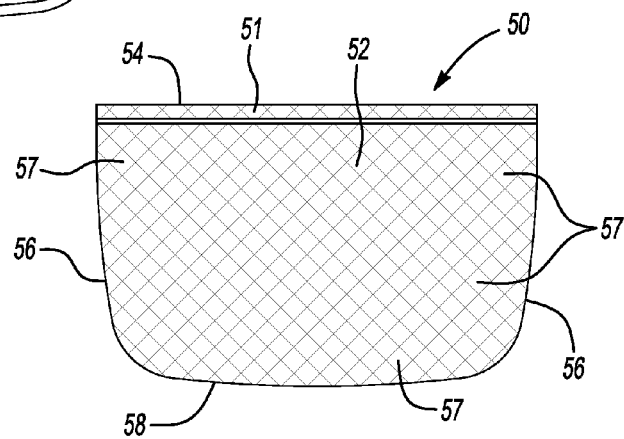
FIG. 3D is a schematic plan view of the insert of FIG. 3A constructed of an alternative material.

FIG. 3C illustrates an alternative construction providing retention features configured from tabs 45 and cording 43. As discussed for FIG. 2C, insert 40 may be configured as described for insert 20, of material or materials 42 as described previously for insert 20, and having a top or lead edge 44, an optional trim, foldover or hem 41, which may be reinforced, side edges 46 and a bottom edge 48. Edges 46 of insert 40 may be shaped to provide cutout or scalloped sections defining openings 47. Edge 48 may be unfinished, shaped similarly to edges 46 or folded over and hemmed to provide a carrier or conduit for cord 43, as shown in FIG. 3C. Edges 46 may be shaped to define tabs or extensions 45 at intermittent intervals along the edges 46. Tabs or extensions 45 may be configured by any suitable means to provide a carrier or conduit for a cord 43. For example, the ends of tabs 45 may be folded over and stitched to provide a generally cylindrical carrier or conduit through which cord 43 may be threaded. Holes, clips, fasteners or grommets (not shown) may be incorporated into the tabs 45 through which cord 43 may be laced, threaded or attached, or cord 43 may be stitched, stapled, clipped, or otherwise adhered to tabs 45 as discussed for FIG. 3B. Cord or cording 43 may be, for example, an elastic, textile or bungee cord, or may be configured from a strap, band or cut length of any suitable elastomeric, elasticized or textile material. Loops, openings or holes 47 formed by operatively attaching cord 43 to tabs 45 may correspond to attaching features on a retainer or on second surface 66 of panel 12, such that cord 43 may be looped over or operatively attached to the corresponding attaching features so as to retain insert 40 in slot 18 to form pocket 17. The end portions of cording 43 may be entrapped or fastened within the foldover or hem portion 41 by stitching, adhesive or other suitable means. Additionally, a portion of bottom edge 48 may be folded over or hemmed to provide a carrier for cord 43, through which cord 43 may be threaded or inserted. The end portions of cording 43 may be entrapped by or fastened to bottom edge 48. Cord 43 may be provided as a single continuous element, for example, a single length of cording threaded through openings in tabs 45 and attached to bottom edge 48. Alternatively, retention feature 43 may be provided in two or more segments, for example, in two segments each attachable to tabs on one side 46 terminating on each respective side 46 in portion 41 and at bottom edge 48 of insert 40.

The features and elements illustrated in FIGS. 3A, 3B and 3C may be used in combination. For example, an insert may be constructed with side edges 46 and cording 43 configured as shown in FIG. 3C. Rickrack 33 may be attached to the same insert at a bottom edge 38 as shown in FIG. 3B. As discussed previously, tabs 45 of insert 3C may incorporate grommets, clips or fasteners which would be attachable to corresponding attachment features to retain insert 40, where cord 43 may not be required. As would be understood by one skilled in the art, numerous combinations of the construction alternatives shown in FIGS. 3A-3D may be possible.

Figure 4A:
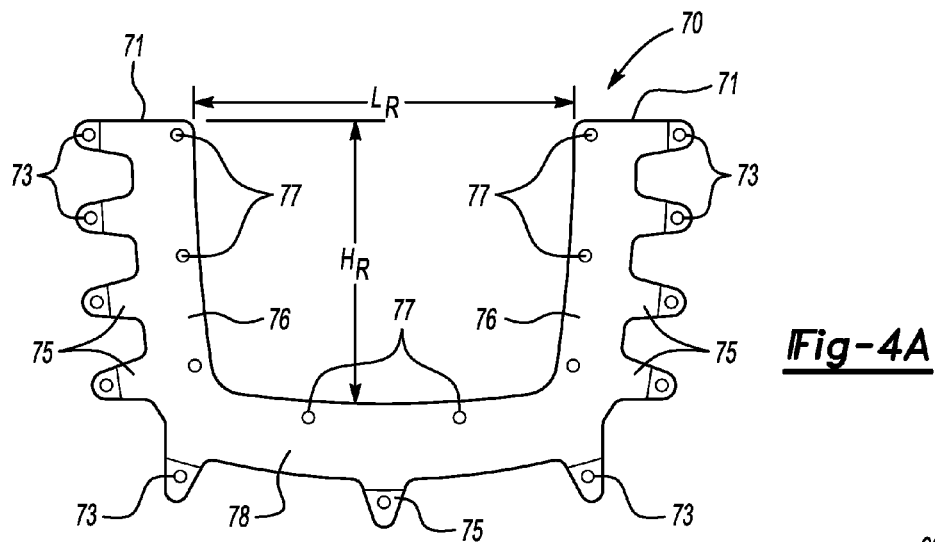
FIG. 4A is a schematic plan view of a retainer of the panel member assembly of FIG. 1.

Referring now to FIG. 4A, shown at 70 is a retainer configured to be operatively attachable to the second surface 66 of panel member 12. In a preferred embodiment, the retainer 70 is generally U-shaped such that the central portion of the retainer includes side portions 76 and bottom portion 78. Descriptors such as "side," "bottom," "top," "inboard," and "outboard," where used to describe elements and features of a slot 18, retainer 70, 90, 95 or an insert 20, 30, 40, 50, generally refer to the orientation of retainer and/or insert as assembled in seat panel 12 oriented in seat assembly 10 of FIG. 1. As shown in FIG. 4A and also in FIG. 5 B, side portions 76 and bottom portion 78 of retainer 70 are configured to complement the surface profile of the second surface 66 in the area surrounding slot 18, such that when retainer 70 is attached to panel 12, retainer 70 complements second surface 66 to securely and uniformly compress the portions of insert 20 protruding from slot 18 on second side 66 of panel 12 against surface 66, and to securely and uniformly retain insert 20 in slot 18, along the entire length of slot 18. A central opening or open section is defined by the U-shape of retainer 70, as shown in FIG. 4A, where the overall length from one side of the opening to other side is shown as $L_R$, and the overall height of the opening from the top of retainer 70 to the bottom of the open section, is shown as $H_R$. The length $L_R$ of retainer 70 is less than the length $L_S$ of slot 18, the height $H_R$ of retainer 70 is greater than the height $H_s$ of slot 18 and top edge 71 of retainer 70 extends above end 11 of slot 18 so that the central portion of retainer 70, including side portions 76 and bottom portion 78 cover the entirety of slot 18 to retain insert 20 when retainer 70 is attached to surface 66 of panel 12.

As illustrated in FIG. 4A, in a preferred embodiment, retainer 70 may include a plurality of tabs, fingers or extensions 75 which may be positioned at intervals extending from side portions 76 and/or bottom portion 78 of retainer 70. Finger or extension 75 may include an attachment feature 73 which corresponds to an attachment feature 63 on surface 66 of panel member 12. Each extension 75 and attachment feature 73 is dimensioned so attachment feature 73 is located outboard the perimeter of insert 20, when insert 20 is assembled in slot 18 (see FIG. 5B). Attachment features 77 are generally located at intervals along the inboard perimeter of retainer 70, and, like attachment features 73, are used to fasten or attach retainer 70 to second surface 66 of panel 12 by attaching to corresponding features 67 (see FIG. 2B). Attachment features 73, 77 may be of any suitable configuration corresponding to attachment features 63, 67 on a second surface 66 of panel 12 (see FIG. 2B). For example, one or more of attachment features 73, 77 may be a stud, rivet, protrusion, opening, hole, slot, loop, clip, hook, tab, finger, bolt, screw, nut, hook or loop (Velcro™) or adhesive type fastener.

As discussed previously, side portions 76 and bottom portion 78 are configured to complement the surface profile of the second surface 66 in the area surrounding slot 18, such that when retainer 70 is attached to panel 12, retainer 70 complements second surface 66 to securely and uniformly compress the protruding portions of insert 20 against second surface 66, and retain insert 20 in slot 18, along the entire length of slot 18. Retainer 70 may be generally flat, as shown in FIG. 4A, or may be, as shown for a retainer 90 in FIG. 4B, configured with transition sections 94 of varying depth and profile to complement the profile of panel member 12. For example, transition sections 94 of retainer 90 may be profiled to complement a generally recessed portion 14 of panel member 12 (see FIG. 2A). Referring again to FIG. 4B, one or more of the extensions 75 may include a land area 92 which may be configured to conform with surface 66 or an attachment feature 63 when retainer 90 is attached to panel 12. The land area 92 may be of any suitable configuration, for example, land 92 may be a thicker or raised portion in comparison with extension 75, or may be a thinner or recessed portion in comparison with extension 75, or may be configured as a slot, tab or other feature to provide additional strength or flexibility to attachment feature 73 or to complement the configuration of a corresponding attachment feature 63, for example.

Figure 4B:
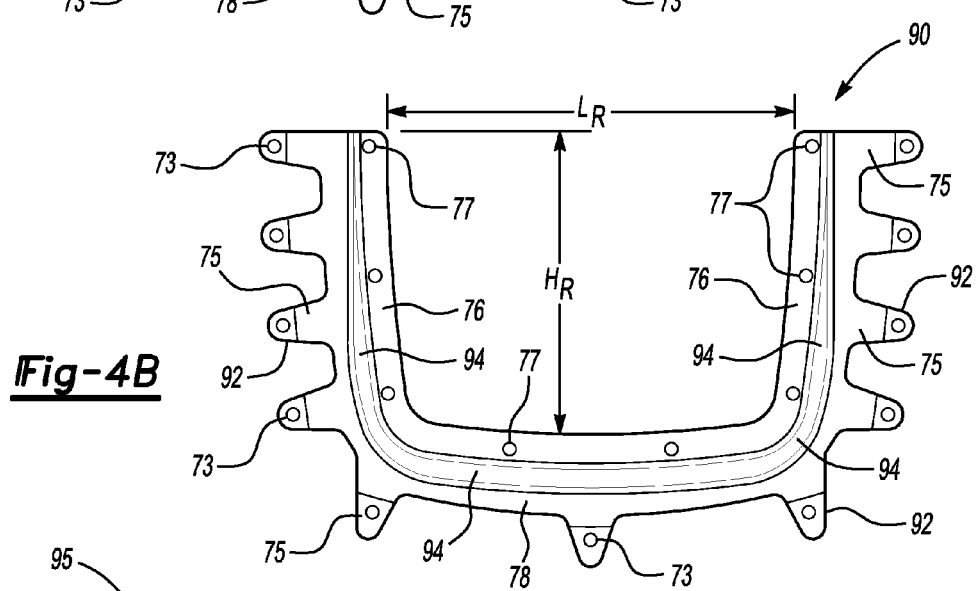
FIG. 4B is a schematic plan view of the retainer of FIG. 4A including a transition portion.
Figure 4C:
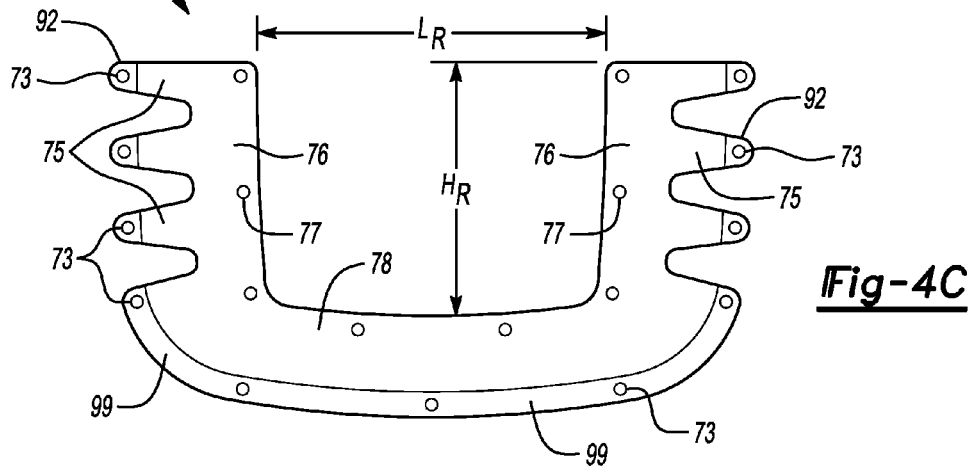
FIG. 4C is a schematic plan view of the retainer of FIG. 4A illustrating an alternative construction.

Referring to FIG. 4C, the overall configuration of retainer 70 may be varied to optimize distribution of the retention or compression force of retainer 70 against an insert 20 (30, 40, 50) in slot 18 across the perimeter portions of insert 20, e.g., those portions adjacent to edges 26, 28 against surface 66 of panel 12. For example, as shown in FIG. 4C, a retainer 95 may be configured with tabs 75 extending from side portions 76 but not from bottom portion 78. Alternatively, as shown for retainer 95, bottom portion 78 may be a continuous section to provide additional compression across the entire span of bottom edge portion 28 of insert 20. A ridge, or extended land 99, may be provided to entrap or provide additional compression on insert 20 as it is retained against surface 66, or, as discussed previously, to complement the profile of surface 66.

In a preferred embodiment, retainer 70 (90, 95) is molded from a resin, plastic or polymeric material, and attachment features 73, 77 are molded into retainer 70 during the process of forming panel member 12. Alternatively, retainer 70 may be fabricated from a metallic, polymeric or laminate material, by stamping, pressing or other suitable means. Attachment features 73, 77 may be fabricated during the fabrication operation producing retainer 70 or fabricated and/or finished by a subsequent operation or operations, such as machining, cutting, punching, grinding, welding or other means suitable to provide attachment features 73, 77 in retainer 70.

The features and elements illustrated in FIGS. 4A, 4B and 4C may be used in combination. For example, a retainer 95 may be constructed including a transition portion 94, or a retainer 70 may include land areas 92 on one or more extensions 75. As would be understood by one skilled in the art, numerous combinations of the construction alternatives shown in FIGS. 4A-4C are possible.

Figure 5A:
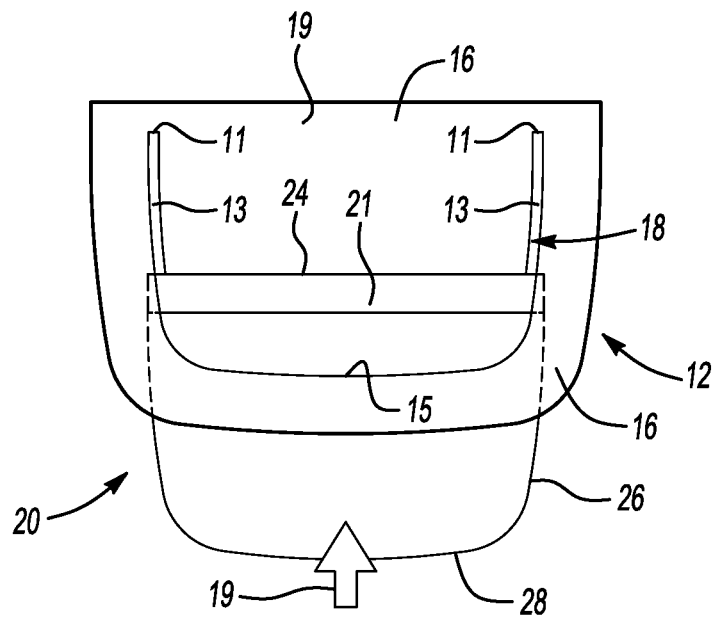
FIG. 5A is a schematic view of a step in the method of inserting the insert of FIG. 3B in the slot of the panel member of FIG. 2A.

Referring to FIG. 5A, shown is a schematic view of the assembly of insert 20 into slot 18 or panel member 12. Insert 20 is aligned so that leading edge 24 is guided into the bottom opening 15 of slot 18, and is inserted by moving the insert 20 in a direction 19 into the slot 18, such that the side edges 26 of insert 20 remain outside or outboard of slot 18 to protrude on side 66 of panel member 12 when the side portions of insert 20 adjacent to edges 26 are retained in the side portions 13 of slot 18. Insert 20 is inserted in a direction 19 until leading edge 24 is proximate or in contact with the ends 11 of slot 18. Ideally, insert 20 is positioned within slot 18 such that nearly equal portions of insert 20 protrude along the length of slot 18 when viewed from second side 66 of panel 12. When installed and viewed from first side 16 of panel 12, the portion of insert 20 visible inboard of the "U" shape of the slot defines a pocket with first side 16 of panel 12, where the pocket edges are defined by the outboard edges of the slot 18 and the pocket opening is defined by the visible portion of lead edge 24.

Figure 5B:
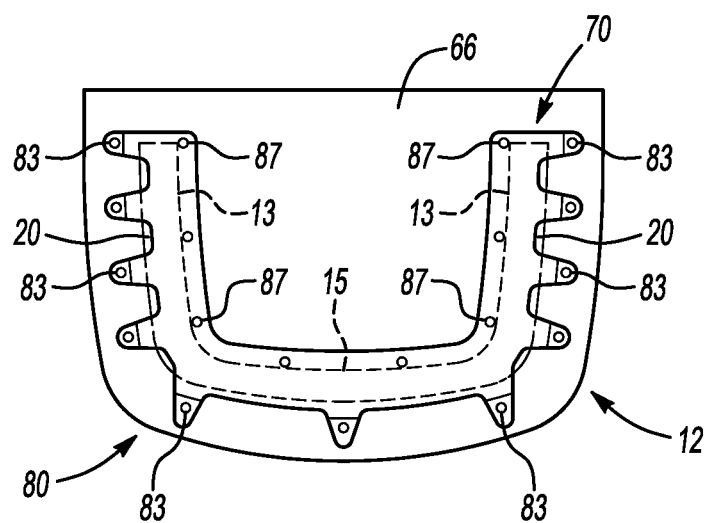
FIG. 5B is a schematic view of the assembly of the retainer of FIG. 4A to the panel member of FIG. 2B.

Referring to FIG. 5B, shown generally at 80 is a schematic view of the assembly of retainer 70 to surface 66 of panel 12. Retainer 70 is assembled and attached to surface 66 after insert 20 has been installed in slot 18 as described for FIG. 5A. As shown in FIG. 5B, retainer 70 (90, 95) is placed adjacent to surface 66 of panel 20 and the protruding portions of insert 20 are visible when viewing surface 66. Attachment features 73 and 77 of retainer 70 (see FIG. 4A) are aligned with their respective corresponding attachment features 63 and 67 on surface 66 of panel 12 (see FIG. 2B) and are attached or fastened using a means suitable for attaching or fastening each combination of attachment features 63, 73 and 67, 77 to define or form respective attachments or attachment points 83 and 87, as shown on FIG. 5B. When fastened, retainer 70 exerts compressive pressure to retain insert 20 against surface 66 and in slot 18, to form pocket 17 between the portion of insert 20 visible from surface 16 and the portion 19 of surface 16 underlying the visible portion of insert 20. Retainer 70 may be retained against surface 66 during assembly and fastening to form attachments 83, 87, by a fixture or other suitable means to ensure a minimum compression of the entrapped portion of insert 20 between retainer 70 and surface 66 is sustained after assembly.

In a preferred embodiment, attachment features 63, 67 are studs or protrusions formed on surface 66 when panel 12 is molded or fabricated. Corresponding attachment features 73, 77 in retainer 70 are holes or openings corresponding in size to studs or protrusions 63, 67 such that each stud or protrusion 63, 67 aligns with and protrudes through its corresponding hole or opening 73, 77 when retainer 70 is installed on surface 66 of panel 12. After alignment and installation of retainer 70, the protruding portion of each stud or protrusion 63, 67 is permanently deformed by, for example, heat staking, staking, spinning, knurling or otherwise permanently deforming the protruding portion against the surface of retainer 70 surrounding the corresponding opening 73, 77 to create an attachment 83, 87, respectively, between retainer 70 and surface 66. Retainer 70 may be retained against surface 66 during assembly and staking by a fixture or other suitable means to ensure a minimum compression of the entrapped portion of insert 20 between retainer 70 and surface 66 and sufficient protrusion of stud or protrusion 63, 67 though opening 73, 77 to provide an attachment 83, 87 of sufficient strength.

As understood by one skilled in the art, any combination of attachment features 63, 67, 73, 77 may be used as would be suitable to the particular retainer and panel configurations and the respective materials used for each, to provide, when fastened or attached, the minimum compression and attachment durability required to produce and retain pocket 17 in panel assembly 12. For example, a combination of a tab and slot, screw and hole, threaded stud and nut, hook and loop fastener, clip and retainer may be used. Alternatively, a separate fastener or fasteners such as a rivet, grommet, bolt and nut, clip or other suitable fastener may be used to attach corresponding holes, openings or features of retainer 20 and surface 66.

As shown in FIGS. 6A and 6B, retention features of the insert may also be used to retain an insert 20 (30, 40, 50) in slot 18, or to supplement the retention provided by retainer 70. In FIG. 6A, generally shown at 100 is a schematic of insert 40 installed in panel 12 and retained by retainer 70. Loops formed by cord 43 operatively attached to tabs 45 of insert 40 are looped over extensions 75 to retain insert 40 in slot 18 and increase the pull resistance of insert 40 through slot 18 when pocket 17 is opened or extended outwardly from portion 19 of surface 16 of panel 12 during use. The retention features of insert 40 may be supplemental to attachments 83, 87, or may substitute for one or more of attachments 83, 87. For example, some or all of attachments 83 may not be needed, or may be decreased in number, where attachments 87 provide sufficient compression of insert 40 against surface 66 and in slot 18, and insert 40 is retained along its side edges 46 by cords 43 looped over extensions 75.

Alternatively, the compression of side edges 46 in side portions 13 of slot 18 may be modified, through adjustment of attachments 83, 87 and/or by adjustment of width $W_1$ of slot side portions 13 (see FIG. 2A) to permit additional incremental expansion of pocket 17 outwardly from portion 19, by allowing the side portions of insert 40 which are retained between retainer 70 and surface 16 to extend through side slot portions 13, thus increasing the expanded pocket storage capacity. In this configuration, cords 43 limit the extension of the side portions of insert 40, so that edges 46 of insert 40 remain retained in side slots 13 and between retainer 70 and surface 16. When the additional expansion of pocket 17 is no longer required, the side portions of insert 40 may be retracted through side slot portions 13 to return to an as-assembled or minimally expanded position between retainer 70 and panel surface 16, by cords 43.

Another example using the retention features of an insert is shown in FIG. 6B, where, generally shown at 110 is an insert 50 installed in panel 12 and retained by retainer 70. Openings 57 in netting 52 near insert edges 56 may be looped over extensions 75 to retain insert 50 in slot 18 and increase the pull resistance of insert 50 through slot 18 when pocket 17 is opened or extended outwardly from surface 16 of panel 12 during use of the pocket. As discussed previously, the retention features of insert 50 may be used to supplement attachments 83, 87, or may substitute for one or more of attachments 83, 87. Alternatively, and as discussed previously for FIG. 6A, the compression provided by slot side portions 13 may be adjusted by modification of attachments 83, 87 or variation of width $W_1$ of slot side portions 13, such that the side portions of insert 50 retained between retainer 70 and surface 16 when pocket 17 is in a non-expanded or minimally expanded condition may be extended through slot side portions 13 to provide increased outward expansion of pocket 17 and increased pocket storage capacity for the user. Similar to the configuration of FIG. 6A, when increased expansion of pocket 17 is no longer required, for example, following removal of a stored object from pocket 17, the side portions of insert 50 may be retracted through slot side portions 13 to an as-assembled or minimally expanded position between retainer 70 and panel surface 16, by portions of netting 52 looped over extensions 75.

FIG. 7 illustrates a combination of panel member 12, retainer 95 and insert 20, shown generally at 120. Panel member 12 is covered by an appearance material 126, for example, leather, which covers a first surface 16 of panel 12. The unfinished edges of slot 18 are covered with trim piece(s) 126. Trim piece 126 may be a selvage edge or trim margin of appearance material 126 folded over the edge of slot 18 and adhered to surface 66 adjacent to the slot with an adhesive or by other suitable means. Alternatively, trim piece or pieces 126 may be separate trim pieces, for example, a chromed trim piece or trim channel, which can be placed over and operatively attached to the edge of slot 18 to cover the unfinished edge of slot 18 and/or the edge or selvage of appearance material 126 covering first surface 16. In this configuration, the widths $W_1$ and $W_2$ of the sides and bottom portion of slot 18 (see FIG. 2A) may be widened to accommodate the additional thicknesses of trim or trim pieces 126 on edges of slot 18. The bottom land, lip or ridge 99 of retainer 95 may be relieved or stepped to provide suitable compression of the multiple layers of material, e.g., the layered insert 20 and trim and/or appearance covering 126 to sufficiently entrap and retain insert 20 in slot 18, e.g., to provide adequate pull resistance to prevent displacement of insert 20 from slot 18.

Referring again to FIG. 5A, depicted is a method of this invention, wherein a seat assembly 10 is fabricated. Panel member 12 is formed with a slot 18 to receive the insertion of an insert 20. After the insert 20 is inserted, a pocket 17 is formed by the combination between the back surface of insert 20 and the front or appearance surface portion 19 of panel member 12. Referring also to FIG. 5B, panel member 12 is formed with attaching features 63, 67. A retainer 70 is formed with attaching features 73, 77 on surface 66. After the insert 20 is inserted into slot 18 to form pocket 17, a retainer 70 is assembled to panel member 12 by forming attachments 83, 87. Attachments 83, 87 are formed by attaching the attaching features 63, 67 of panel member 16 to the corresponding attaching features 73, 77 of retainer 70. Referring to FIGS. 6A and 6B, the method may further include fabricating an insert 40, 50 to include attachment features 43, 52, and attaching the insert 40, 50 to the assembled retainer 70 and panel member 12 using attachment features 43, 52.

While the best modes for carrying out the invention have been described in detail, those familiar with the art to which this invention relates will recognize various alternative designs and embodiments for practicing the invention within the scope of the appended claims.

The invention claimed is:

1. A panel member assembly having a pocket, comprising:
   a panel defining a slot and a pocket portion;
   the panel defining at least one attaching feature configured to attach the panel to a retainer;
   an insert defining another pocket portion; and
   the retainer defining at least another attaching feature corresponding to the at least one attaching feature and configured to be attachable to the at least one attaching feature;
   wherein the insert is configured to be insertable into the slot;
   wherein the panel and the retainer are configured to be operatively attachable to each other so as to retain the insert in the slot sufficiently to form the pocket with the pocket portions; and
   wherein the insert, the at least one attaching feature, and the at least another attaching feature are configured such that the insert retained in the slot is not in contact with either of the at least one attaching feature and the at least another attaching feature.

2. The panel member assembly of claim 1, further comprising:
   at least one attachment defined by the at least one attaching feature directly attached to the corresponding at least another attaching feature.

3. The panel member assembly of claim 1,
   wherein one of the at least one attaching feature and the at least another attaching feature is configured as one of a stud, rivet, protrusion, bolt screw, nut, opening, hole, slot, loop, clip, hook, tab, finger, hook fastener, loop fastener and adhesive.

4. The panel member assembly of claim 1,
   wherein the at least one attaching feature is defined by the panel and configured as one of a protrusion or an opening;
   wherein the at least another attaching feature is defined by the retainer and configured as the other of the protrusion or the opening;
   wherein the panel and retainer are operatively attachable to each other by inserting the at least one protrusion through the at least one opening and fixedly attaching the at least one protrusion to the at least one opening by one of staking, heat staking, spinning or riveting the protrusion.

5. The panel member assembly of claim 1, wherein the insert is fabricated from at least one of a leather, vinyl, cloth, polymeric, plastic, textile, mesh and netted material.

6. The panel member assembly of claim 1,
   wherein the insert is configured to include at least one of a cord, strap, loop, band, elastic, bungee, rickrack, tab, hole and opening; and
   wherein the insert is operatively attached to one of the panel and retainer by the at least one of a cord, strap, loop, band, elastic, bungee, rickrack, tab, hole and opening.

7. The panel member assembly of claim 1, wherein the slot is configured as a non-linear slot.

8. The panel member assembly of claim 1, wherein the slot has an edge at least partially finished with one of a trim piece, a coating, a film, a hem and an appearance material.

9. The panel member assembly of claim 1, wherein the slot is generally configured as a U-shaped slot.

10. The panel member assembly of claim 1,
    wherein the panel has a first surface and a second surface;
    wherein the first surface of the panel is an appearance surface cooperating with the insert to form the pocket; and
    wherein the retainer is operatively attached to the second surface.

11. A seat assembly operatively attached to a body of a motorized vehicle, the seat assembly comprising:
    a panel defining a slot and at least one attaching feature;
    an insert including a leading edge; and
    a retainer defining at least one corresponding attaching feature;
    wherein the insert is configured to be insertable into the slot by inserting the leading edge into the slot;
    wherein the insert is retained in the slot to form a pocket with the panel when the insert is inserted into the slot and the retainer is attached to the panel by direct attachment of the at least one attaching feature with the at least one corresponding attaching feature; and
    wherein the pocket includes an opening defined by the leading edge.

12. The seat assembly of claim 11,
    wherein the insert is configured to include at least one of a cord, strap, loop, band, elastic, bungee, tab, hole and opening; and
    wherein the insert is operatively attached to one of the panel and retainer by the at least one of a cord, strap, loop, band, elastic, bungee, rickrack, tab, hole and opening.

13. The seat assembly of claim 11,
    the panel including a first surface and a second surface;

wherein the first surface is an appearance surface cooperating with the insert to form the pocket;
wherein a portion of the insert protrudes from the slot on the second surface; and
wherein the retainer is operatively attached to the second surface and in direct contact with the portion of the insert protruding from the slot on the second surface.

14. The seat assembly of claim 11,
wherein one of the at least one attaching feature and the at least one corresponding attaching feature is configured as one of a stud, rivet, protrusion, bolt screw, nut, opening, hole, slot, loop, clip, hook, tab, finger, hook fastener, loop fastener and adhesive; and
wherein the at least one attaching feature is configured to be attachable to the at least one corresponding attaching feature when the panel and the retainer are operatively attached to each other.

15. The seat assembly of claim 11,
wherein the slot is generally configured as a U-shaped slot.

* * * * *